(12) United States Patent
Brown et al.

(10) Patent No.: US 6,360,284 B1
(45) Date of Patent: Mar. 19, 2002

(54) SYSTEM FOR PROTECTING OUTPUT DRIVERS CONNECTED TO A POWERED-OFF LOAD

(75) Inventors: John M. Brown, Austin; William P. Bunton, Pflugerville; James S. Klecka, Georgetown; Charles E. Peet, Jr.; David A. Brown, both of Austin, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/231,407

(22) Filed: Jan. 13, 1999

(51) Int. Cl.[7] .......................... G06F 13/14; G06F 13/20
(52) U.S. Cl. ........................ 710/15; 710/18; 713/300; 327/41; 327/108; 327/295; 327/394
(58) Field of Search ........................ 327/41, 394, 295, 327/108; 710/15, 18; 713/300

(56) References Cited

U.S. PATENT DOCUMENTS

| 5,736,873 A | * | 4/1998 | Hwang | 327/41 |
| 5,850,159 A | * | 12/1998 | Chow et al. | 327/394 |
| 6,107,855 A | * | 8/2000 | Wilcox | 327/295 |

\* cited by examiner

*Primary Examiner*—Thomas Lee
*Assistant Examiner*—Rehana Perveen
(74) *Attorney, Agent, or Firm*—Leah Sherry; Oppenheimer Wolff & Donnelly LLP

(57) ABSTRACT

A system for preventing a powered-up sub-unit from driving a powered-off low-impedance load transitions to a NO_CLOCK state and tri-states output drivers of the sub-unit output unless a clock signal is received from a connected sub-unit. While in the NO_CLOCK state, the sub-unit periodically transmits bursts of clock signals to signal the other sub-unit that it is powered up.

8 Claims, 2 Drawing Sheets

SYSTEM FOR PROTECTING OUTPUT DRIVERS CONNECTED TO A POWERED-OFF LOAD

BACKGROUND OF THE INVENTION

In a multi-cabinet computer system with on-line serviceability, it is entirely possible for some electronic (circuits) to be powered from the system's power subsystem and for other circuits to be unpowered. This situation can also occur when circuits and/or sub-units of the system receive power supply from different sources. This can cause problems when signals are driven by CMOS circuits to CMOS receiver circuits that are unpowered. A CMOS output driver trying to drive an unpowered CMOS receiver could cause severe damage to the driving transistor due to the essentially short circuit current paths presented by the unpowered circuit. This is illustrated in FIG. 1, showing a driving circuit (Q1D, Q2D p channel, n-channel, respectively) coupled to a receiving circuit (Q1R, Q2R p channel, n-channel, respectively) by a conductor 10. (The circuits Q1D, Q2D and Q1R, Q2R may, for example, be carried by a circuit board (not shown) or an integrated circuit on a circuit board.) The driving circuit, Q1D, Q2D, and receiving circuit, D1R, Q2R, reside in different power zones and are respectively connected to a different power supply. The receiving circuit is connected to its respective power supply (P.S.) along with other circuits on the board or integrated circuit. If the driving and receiving circuits are CMOS construction, the receiving circuits Q1R, Q2R will have parasitic diodes D1, D2 formed between their gate leads and their respective drain leads.

Now, suppose that the receiver circuit Q1R, Q2R is unpowered. If the driver circuit Q1D, Q2D is tuned on for communication, the transistor Q1D will conduct. However, since the power supply P.S. is not yet powered, it will be in essentially a low impedance state, as will the other circuits ("Load") associated with the receiver circuit Q1R, Q2R. Turning on Q1D will apply Vdd(1) to the gate lead of Q1R to turn on its associated parasitic diode D1, creating a low impedance path from the supply voltage (Vdd(1)) of the driver circuit (Q1, Q2D), through the parasitic diode D1, and the parallel (low) impedance presented by the power supply and load associated with the receiver circuit Q1R, Q2R. The resultant excessive current flow permitted by the low impedance path can cause long-term reliability problems in the driving circuit if allowed to persist. The addition of electrostatic discharge ESD) protection diodes (not shown) as are typically used will only exacerbate this problem.

One approach to avoiding this problem is to provide a power line that communicates the "power on" state from the receiver circuit to the driver circuit, informing the latter that the receiver circuit has power. This will require a dedicated pin and conductor at each end for this purpose. (Usually, the communication is bi-lateral, so that a similar power signal is communicated from the driver end. Thus, if the driver and receiver circuits are in different power zones, as FIG. 1 illustrates, two conductors and associated pins must be used.) In many complex circuits/systems, such an extravagant use of pins and conductors is costly.

SUMMARY OF THE INVENTION

The invention provides a simple and relatively inexpensive mechanism that avoids dedicating use of a signal line (and associated pins at each end) to provide an indication in one power zone that at another power zone a circuit at the transmitting end or side is powered. Broadly, the invention transmits a periodic (e.g., clock) signal to indicate that power is available at the transmitting end or side. Conversely, at the receiver side a detector listens for such a clock signal to determine if the other (transmitting) side is powered or not.

The present invention is directed to use in which elements of systems reside in different power zones (i.e., they receive supply power from different sources). One aspect of the invention has a driver circuit initially sending a clock signal across power zones to a receiving side to indicate that the transmitting side is powered. A detected absence of the clock signal at the receiving side will cause all output driver circuits of the receiving side coupled to the transmitting side to be disabled, i.e., placed in a high-impedance or off state, to prevent the driver circuits from operating into a low impedance load of a powered-down circuit.

According to another aspect of the invention, the transmitting side will periodically send short bursts of the clock signal while holding all other driver circuits of the transmitting side in the high-impedance state to inform the receiving side that the transmitting side is powered-up. At the same time, the transmitting side monitors its receiver circuitry to detect a similar clock signal from the receiving side, indicating a powered condition.

According to another aspect of the invention, the transmitting side will place those driver circuits coupled to the receiving end in an enabled state when a clock signal is detected as being sent by the receiving side.

According to another aspect of the invention, after detection of a clock signal from the receiving side, the transmitting side continues to drive its output circuits regardless of whether a clock signal continues to be received from the receiving side until a predetermined delay expires.

Other features and advantages of the invention will be apparent in view of the following detailed description and appended drawings.

DESCRIPTION OF THE SPECIFIC EMBODIMENTS

Figure 2:
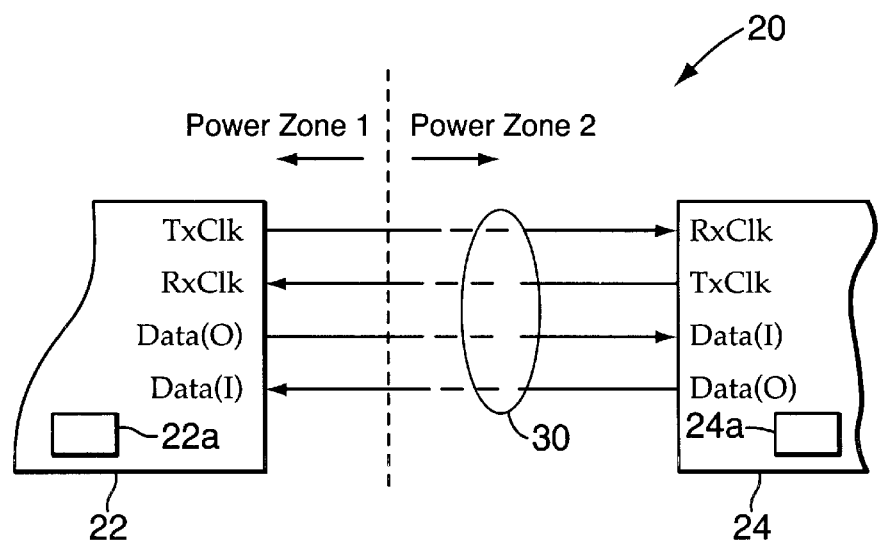
FIG. 2 illustrates, in simplified block diagram form, a pair of intercoupled sub-systems structured to incorporate the present invention.

Turning now to FIG. 2, there is illustrated a portion of a larger system 20, comprising sub-units 22, 24 communicatively coupled to one another by signal lines 30. As FIG. 2 shows, the two sub-units 22, 24 reside in different power zones: Power Zone 1, and Power Zone 2, respectively. This means that the sub-unit 22 is provided a supply of power from a power source that is different from that supplied the sub-unit 24, as may often happen if the two sub-units are located in different cabinets (or even in the same cabinet), creating an environment as described above.

Figure 1:
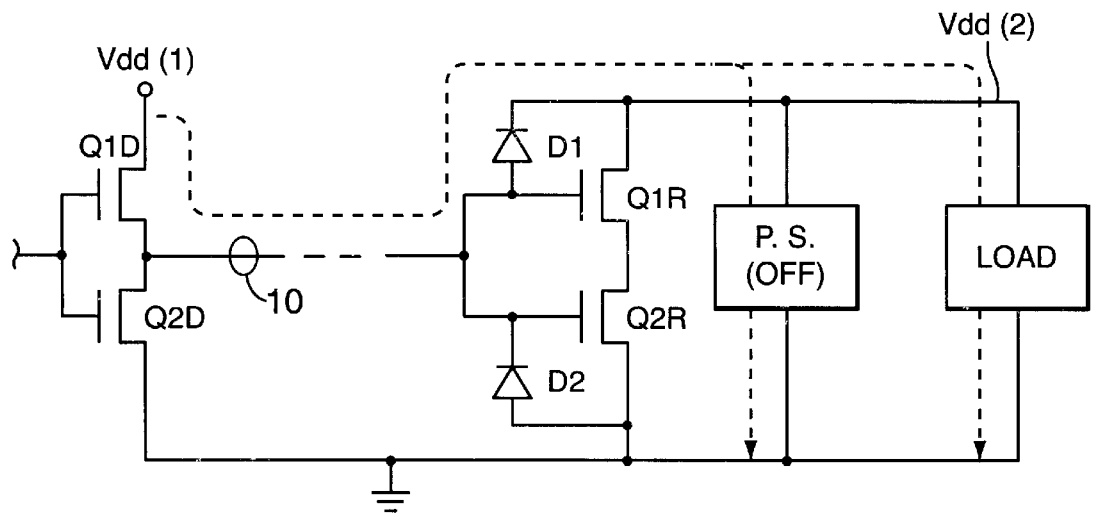
FIG. 1 is a diagram depicting a prior art CMOS input circuit in a low-impedance state being driven by a CMOS driver circuit.

Each of the sub-units 22, 24 has a number of outputs and inputs implement in CMOS technology and configured similarly as shown in FIG. 1, including a transmit clock output (TxClk), a receive clock input (RxClk) and at least one data output (Data(O)) and a data input (Data(I)). Thus, in normal operation data may be synchronously sent from the data output Data(O) accompanied by a clock sent from TxClk output of one of the sub-units for receipt at the Data(I) and TxClk inputs of the other of the sub-units. For example, data sent from Data(O) of the sub-unit 22, will be accompanied by a transmit clock, TxClk from the sub-unit 22. At the receiving end, sub-unit 24, the input RxClk and Data(I) will receive the transmit clock and data, respectively. A similar operation occurs in the reverse direction. Each output has a CMOS driver circuit similar to that depicted in FIG. 1, and each receiver input will connect to a receiver circuit similar to that also illustrated in FIG. 1.

Logic, here in the form of a state machine 22a, 24a is included in each sub-unit 22, 24, respectively, to implement the present invention. The state machines 22a, 24a connect to the output driver circuits of the TxClk and Data(O) outputs to selectively enable or disable (e.g., place in a high-impedance state) such outputs.

However, since the two sub-units 22, 24 are separately powered, care must be taken to avoid stressing the CMOS output circuits used for TxClk and Data(O) of the sub-units 22, 24. Briefly, when the two sub-units 22, 24 are first powered, the respective state machines 22a, 24a will place all driver circuits, including those coupled to the TxClk and Data(O) outputs, in a disabled state. Then, one driver circuit (e.g., that connected to the TxClk output) will be enabled, allowing each sub-unit to send short bursts of clock pulses to one another before the driver circuits are again disabled. The number of clock pulses (approximately 100 for a 125 MHz clock) of each burst is determined by the particular fabrication of the output circuitry (here, CMOS), and how much current the metalization can withstand should the receiving end be in a low impedance state (i.e., unpowered). Except for the periodic bursts of a clock signal, all data and clock outputs are best in disabled states until a sub-unit 22, 24 receives an indication of power from its companion in the form of clock pulses.

Figure 3:
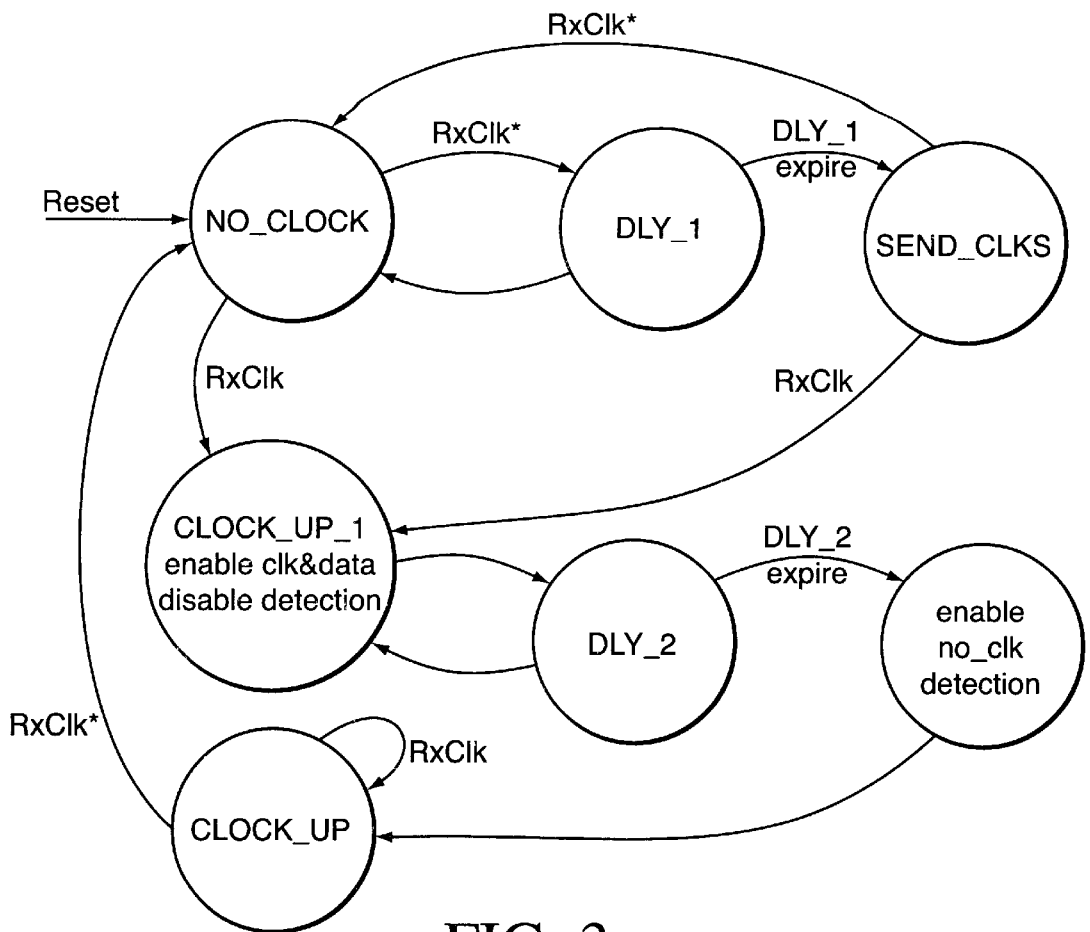
FIG. 3 is a state diagram illustrating operation of an embodiment of the invention.
Figure 4:
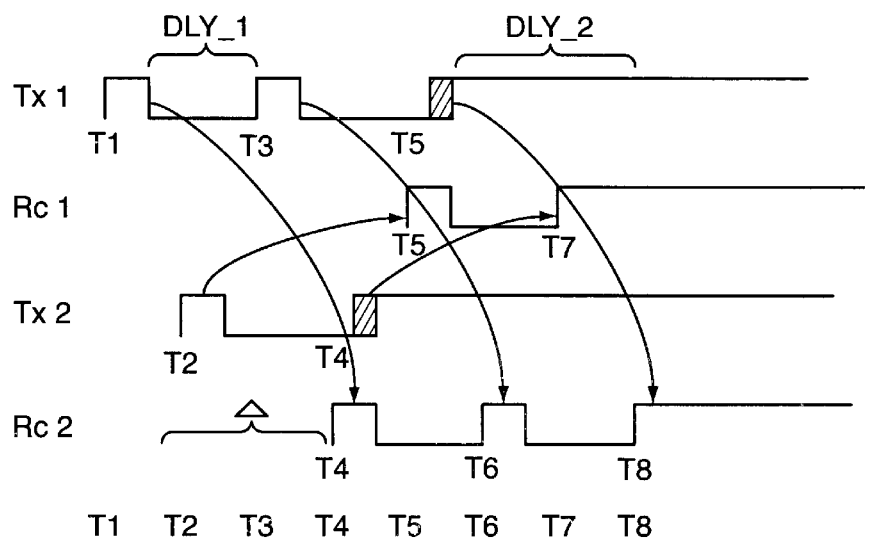
FIG. 4 is a timing diagram illustrating operation of an embodiment of the invention.

FIG. 3 illustrates the state diagram used for testing a companion sub-unit in another power zone to determine if it is in a powered up state, and FIG. 4 illustrates the timing used to determine whether or not a connected companion sub-unit in another power zone has powered on.

Turning first to FIG. 3, when power is first applied to the sub-units 22, 24, they will be placed in the NO_CLOCK state. In this state all output driver circuits are disabled (e.g., place in a high impedance or off state) and a monitoring of the RxClk input is enabled. If, while in the NO_CLOCK state, a clock signal is detected as being received at the RxClk input of the particular sub-unit (e.g., sub-unit 22), it will transition to a CLOCK_UP_1 state in which monitoring of the RxClk input for a clock signal is disabled, and the output circuits of the sub-unit are enabled.

If, on the other hand, no clock signal is detected at the RxClk input in the NO_CLOCK state, the sub-unit will remain in that state for a period determined by DLY_1 (approximately 100 microseconds). When DLY_1 expires, a transition to the SEND_CLKS state will be made at which time the sub-unit will send a short burst of transmit clocks from its TxClk output. If, while in the SEND_CLKS state, a clock signal is detected at the RxClk input, a transition will be made to a CLOCK_UP_1. So indicated, this state causes all associated output circuits coupled to the other sub-unit (e.g., sub-unit 24) to be enabled, and the monitoring of the RxClk input to be disabled. If, on the other hand, while in the SEND_CLKS state, no clock signal is detected at the RxClk input, a transition back to the NO_CLOCK state is made and the process, so far described, repeats.

Assuming that, while in the SEND_CLKS state, a clock signal is detected at the RxClk input, and the transition is made to the CLOCK_UP_1 state, the output circuits of the sub-unit 22 (or sub-unit 24) have now been enabled and the detection for a clock signal at the RxClk input is stopped for a period of time, specifically, a time delineated by a delay of DLY_2 (approximately 100 microseconds). The CLOCK_UP_1 state will be inhabited until expiration of the delay set by DLY_2 state at which time a transition will be made to the CLOCK_UP state and monitoring of the RxClk input is enabled. The sub-unit will remain in the CLOCK_UP state for normal operation. If, however, at any time the monitoring of the RxClk input determines a loss of clock signal (possibly indicating a loss of power at the other end), a transition is made from the CLOCK_UP state to the NO_CLOCK state, at which time the output circuits are again disabled and the process is repeated.

Referring now to the timing diagram of FIG. 4 in conjunction with the state diagram of FIG. 3, assume that both sub-units 22, 24 have been reset and have no information regarding whether the other sub-unit (22/24) has power. Thus, both would initially be in the NO_CLOCK state.

There is a fixed signal propagation delay of magnitude $\Delta$, in this example five units, between the sub-units 22, 24 due to the length of the interconnect—signal lines 30. Thus, if a clock signal is transmitted from sub-unit 22 at time t1 it will arrive at sub-unit 24 at time (t1+$\Delta$). Additional delays are caused by the time of response of the logic in the particular sub-unit.

In this example, sub-unit 22 transmits its first burst of clock pulses (Tx1) first at t1 and sub-unit 24 transmits it first burst at t2. (Note that FIG. 4 depicts the timing of the transmission (or reception) of a number of clocks, and not the individual clock pulses themselves) Sub-unit 22 transmits a second burst of clock pulses at t3 after DLY_1 (in this example 3 units) expires. The first burst from sub-unit 22 is received at sub-unit 24 at t4 and the sub-unit 24 transitions to the CLOCK_UP_1 state and drives a constant clock signal (Tx2; at approximately t4) on its output. The first clock burst from sub-unit 24 is received at sub-unit 22 at approximate time t5 and sub-unit 22 transitions to the CLOCK_UP_1 state and drives a constant clock signal at its TxClk output. The second burst from sub-unit 22 is received at sub-unit 24 at time t6, the constant clock signals transmitted from sub-unit 24 while in the CLOCK_UP_1 state are received at sub-unit 22 at t7, and the constant clock signals output from sub-unit 22 while in the CLOCK_UP_1 state are received at sub-unit 24 at t8.

Note that after sub-unit 24 transitions to the CLOCK_UP_1 state at t4 its reception of clock signals is interrupted between t4 and t6 and t6 and t8. This interruption is due to the magnitudes of the signal propagation delay and DLY_1, as described above, which prevents the constant clock signals generated when sub-unit 22 is in the CLOCK_UP_1 state from immediately reaching sub-unit 24. Thus, although sub-unit 24 transitions to CLOCK_UP_1 at t4 it does not receive a constant clock signal until t8. Accordingly, if clock detection were enabled at t4, i.e., when sub-unit 24 initially transitions to CLOCK_UP_1, then sub-unit 24 would transition back to NO_CLOCK between t4 and t6 when the absence of a received clock signal is detected at the RxClk input of sub-unit 24.

For this reason, clock detection is not enabled until DLY_2 expires. The magnitude of DLY_2 must be selected to account for signal propagation delays (Δ) and logic delays in transitioning between states. Subsequent to DLY_2 expiring, the clock detection capability is enable so that circuit 2 will transition to NO_CLOCK if sub-unit 22 is powered down.

Note that when sub-unit 22 is transmitting bursts of clock signals during NO-CLOCK it is possible that the signals are driving low-impedance inputs of a powered-off sub-unit. Accordingly, the magnitudes of DLY_1 and the number of clock signals transmitted in a burst are selected to cause minimum stress on the output drivers while allowing a fast transition to CLOCK-UP if signals are received on the first clock receive pin. Similarly, continuing to remain in CLOCK_UP and transmitting clock signals sub-unit 22 until DLY_2 expires could possibly cause sub-unit 22 to drive low-impedance input pins of a powered-down sub-unit.

In a preferred embodiment the power-zone crossing circuitry is implemented as part of a state machine (e.g., state machines 22a, 24a, forming part of the sub-units 22, 24, respectively) utilized to auto-configure ports in the Server-Net II system manufactured by the assignee of the present application. This auto-configuration state machine is described in co-pending application Ser. No. 09/206,593, filed Dec. 7, 1998. In ServerNet II the transmission of a clock signal is a reliable indicator that a sub-unit is powered up. Thus, the transition to the CLOCK_OFF state is dependent on the presence of a received clock signal.

The implementation of the power-zone crossing circuitry allows modules in different power domains to be interconnected without concern regarding the state of the power domains. Protection from power supply failure assures that such a failure will not damage the drivers of another connected sub-unit which still has power. When a new module is plugged in and powered up it will not be damaged if other connected modules are powered off.

What is claimed is:

1. In a system including first and second modules in different power domains, each module including data and clock output pins coupled to drivers and including input pins for receiving clock and data signals, with at least a first clock output pin of each module coupled to a respective first clock receiving pin of the other module, a method, performed in said first module for protecting drivers from driving into a low-impedance powered-down module, said method comprising the steps of:

transitioning to a NO_CLOCK state if no signal is received on said first clock receiving pin, with said output pins, including said first clock output pin, in a high-impedance off state;

while in said NO_CLOCK state monitoring said first clock receiving pin on said first circuit for the presence of a clock signal asserted by the second module;

if no clock signal is received, periodically driving a burst of clock signals on the first clock output pin of the first module to signal the second module that the first module is powered-up;

if a clock signal is received on said first clock receiving pin, transitioning to a CLOCK_UP state;

while in said CLOCK_UP state:

driving all clock and data pins of said first module;

after a predetermined delay to allow said second module to transition to its CLOCK_UP state, monitoring the first clock receive pin of said first module to detect the absence of a received clock signal; and if the absence of a clock signal on the clock receive pin of the first module is detected, transitioning to said NO_CLOCK state so that the first module transitions to the NO_CLOCK state when the absence of a received clock signal is detected.

2. A system for protecting drivers from driving into a low-impedance powered-down sub-unit comprising:

a first sub-unit including data and clock output pins coupled to drivers and including input pins for receiving clock and data signals, with a first clock receiving pin for receiving a transmit clock signal from a second connected sub-unit and with a first clock output pin for transmitting a clock signal to a clock receiving pin of the second sub-unit;

a state machine, responsive to clock signals received at the first clock receiving pin configured:

to transition to a NO_CLOCK state if no signal is received on said first clock receiving pin, with said output pins, including said first clock output pin, in a high-impedance off state;

while in said NO_CLOCK state, to monitor said first clock receiving pin on said first sub-unit for the presence of a clock signal asserted by the second sub-unit;

if no clock signal is received, to periodically drive bursts of clock signals on the first clock output pin of the first sub-unit to signal the second sub-unit that the first sub-unit is powered-up;

if a clock signal is received on the first clock input pin of said first clock receiving pin of said first sub-unit, to transition to a CLOCK_UP state;

while in said CLOCK_UP state:

to drive all clock and data pins of said first sub-unit;

after a predetermined delay to allow said second sub-unit to transition to its CLOCK-UP state, to monitor the first clock receiving pin of said first sub-unit to detect the absence of a received clock signal; and if the absence of a clock signal on the clock receiving pin of the first sub-unit is detected, to transition to said NO_CLOCK state so that the first sub-unit transitions to the NO_CLOCK sate when the absence of a received clock signal is detected.

3. A method for detecting a powered state of a unit in a pair of units that are communicatively intercoupled to one another but are each residing in a different power zone and are separately powered, each unit of the pair of units having an output driver and an input receiver, each output driver of each unit of the pair of units being correspondingly coupled to an input receiver of the other unit, the method comprising:

for each unit of the pair of units, placing, upon the unit being powered, each output driver of said unit in a disabled state;

enabling, after a first delay, a clock-transmitting one of the driver outputs of said unit to transmit clock bursts to the other unit;

monitoring at a clock-receiving one of the input receivers for receipt of opposite clock bursts from the other unit so as to detect when the other unit is powered;

enabling another one of the driver outputs of said unit to transmit a signal to the other unit; and enabling, after a second delay, no-clock detection so as to detect when the other unit is not powered.

4. The method of claim 3, wherein the method avoids stressing the driver outputs.

5. The method of claim 3, wherein transition of the unit to enabling the transmission of the signal to the other unit occurs upon detecting the opposite clock bursts, and wherein the first delay and number of clock signals in the clock bursts are selected to minimize stress on the output drivers while allowing the transition to be fast.

6. The method of claim 3, wherein the signal includes a data signal.

7. The method of claim 3, wherein transition of the unit to enabling the transmission of the signal occurs upon detecting the opposite clock bursts, the method further comprising:

disabling, from the transition until expiration of the second delay, the no-clock detection.

8. The method of claim 3, wherein there is a signal delay including a propagation delay and a logic delay, and wherein the second delay is selected to account for the signal delay in order to avoid enabling prematurely the no-clock detection.

* * * * *

UNITED STATES PATENT AND TRADEMARK OFFICE
CERTIFICATE OF CORRECTION

PATENT NO. : 6,360,284 B1
DATED : March 19, 2002
INVENTOR(S) : John M. Brown et al.

It is certified that error appears in the above-identified patent and that said Letters Patent is hereby corrected as shown below:

Column 1,
Line 24, "receiving circuit, D1R, Q2R, reside in different power zones" it should read -- receiving circuit, Q1R, Q2R, reside in different power zones --;
Line 33, "unpowered. If the driver circuit Q1D, Q2D is tuned on for" it should read -- unpowered. If the driver circuit Q1D, Q2D is turned on for --;
Line 47, "trostatic discharge ESD) protection diodes (not shown) as" it should read -- trostatic discharge (ESD) protection diodes (not shown) as --;

Column 4,
Line 33, "clock pulses (Tx1) first at t1 and sub-unit 24 transmits it first" it should read -- clock pulses (Tx1) first at t1 and sub-unit 24 transmits its first --;

Column 5,
Line 3, "expiring, the clock detection capability is enable so that" it should read -- expiring, the clock detection capability is enabled so that --;
Line 7, "signals during NO-CLOCK it is possible that the signals are" it should read -- signals during NO_CLOCK it is possible that the signals are --;
Line 12, "transition to CLOCK-UP if signals are received on the first" it should read -- transition to CLOCK_UP if signals are received on the first --;

Column 6,
Line 29, "if a clock signal is received on the first clock input pin of" it should read -- if a clock signal is received on --
Line 42, "to the NO_CLOCK sate when the absence of a" it should read -- to the NO_CLOCK state when the absence of a --;

Signed and Sealed this

Fourth Day of June, 2002

*Attest:*

*Attesting Officer*

JAMES E. ROGAN
*Director of the United States Patent and Trademark Office*